(12) United States Patent
Li et al.

(10) Patent No.: US 11,895,354 B2
(45) Date of Patent: Feb. 6, 2024

(54) LIVE BROADCAST INTERACTION METHOD AND APPARATUS, AND READABLE MEDIUM AND ELECTRONIC DEVICE

(71) Applicant: Beijing Bytedance Network Technology Co., Ltd., Beijing (CN)

(72) Inventors: Meilin Li, Beijing (CN); Di Wu, Beijing (CN); Hongshuo Xu, Beijing (CN); Ting Wang, Beijing (CN); Hui Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/087,567

(22) Filed: Dec. 22, 2022

(65) Prior Publication Data

US 2023/0125331 A1    Apr. 27, 2023

Related U.S. Application Data

(63) Continuation of application No. PCT/CN2021/101708, filed on Jun. 23, 2021.

(30) Foreign Application Priority Data

Jun. 24, 2020  (CN) .......................... 202010592409.2

(51) Int. Cl.
*H04N 21/431*    (2011.01)
*H04N 21/2187*    (2011.01)
(Continued)

(52) U.S. Cl.
CPC ..... *H04N 21/4312* (2013.01); *H04N 21/2187* (2013.01); *H04N 21/472* (2013.01); *H04N 21/478* (2013.01)

(58) Field of Classification Search
CPC .......... H04N 21/4312; H04N 21/2187; H04N 21/472; H04N 21/478
See application file for complete search history.

(56) References Cited

U.S. PATENT DOCUMENTS

| 2006/0015903 A1* | 1/2006 | MacBeth | H04N 7/163 725/39 |
| 2009/0144623 A1* | 6/2009 | Jung | G06F 3/0488 345/173 |

(Continued)

FOREIGN PATENT DOCUMENTS

| CN | 105435449 A | 3/2016 |
| CN | 105653167 A | 6/2016 |

(Continued)

OTHER PUBLICATIONS

International Search Report issued for PCT/CN2021/101708 dated Sep. 18, 2021.

(Continued)

*Primary Examiner* — Michael H Hong
(74) *Attorney, Agent, or Firm* — ARENTFOX SCHIFF LLP

(57) ABSTRACT

A live streaming interaction method and apparatus, and a readable medium and an electronic device are provided. The method includes: in response to a selection operation of a user regarding target virtual objects in a live streaming viewing interface, displaying an object trigger operation control, the object trigger operation control being used for the user to perform a target operation to continuously trigger target virtual objects; and during the process of the user performing the target operation on the object trigger operation control, controlling a first display control to move along a first pre-set path, wherein the first display control is used (Continued)

---

S101 — An object trigger operation control is displayed, in response to a selection operation of a user on a target virtual object in a live broadcast viewing interface S102 — A first display control is controlled to move along a first preset path in a process of the user performing the target operation on the object trigger operation control for displaying, in real time, the number of target virtual objects currently triggered by the user.

21 Claims, 5 Drawing Sheets

(51) Int. Cl.
*H04N 21/472* (2011.01)
*H04N 21/478* (2011.01)

(56) References Cited

U.S. PATENT DOCUMENTS

| | | | | |
|---|---|---|---|---|
| 2010/0325583 | A1* | 12/2010 | Aarni | G06Q 30/02 |
| | | | | 715/833 |
| 2011/0131496 | A1* | 6/2011 | Abram | G11B 27/105 |
| | | | | 715/730 |
| 2012/0144330 | A1* | 6/2012 | Flint | G06F 3/04847 |
| | | | | 715/765 |
| 2013/0336638 | A1* | 12/2013 | Fork | H04N 5/765 |
| | | | | 386/278 |
| 2014/0192004 | A1* | 7/2014 | Andersson | G06F 3/041 |
| | | | | 345/173 |
| 2015/0264425 | A1* | 9/2015 | Heinz, II | H04N 21/4318 |
| | | | | 386/223 |
| 2016/0074751 | A1* | 3/2016 | Zhang | A63F 13/2145 |
| | | | | 463/31 |
| 2018/0107372 | A1* | 4/2018 | Van Damme | G06F 3/04883 |
| 2019/0228588 | A1 | 7/2019 | Rockel et al. | |
| 2020/0082599 | A1* | 3/2020 | Manzari | G06T 11/60 |
| 2020/0137319 | A1 | 4/2020 | Pena et al. | |

FOREIGN PATENT DOCUMENTS

| | | |
|---|---|---|
| CN | 106202333 A | 12/2016 |
| CN | 107241636 A | 10/2017 |
| CN | 107680157 A | 2/2018 |
| CN | 108989898 A | 12/2018 |
| CN | 109194973 A | 1/2019 |
| CN | 109218842 A | 1/2019 |
| CN | 109684107 A | 4/2019 |
| CN | 109756787 A | 5/2019 |
| CN | 111212314 A | 5/2020 |
| CN | 111757135 A | 10/2020 |
| KR | 101894956 B1 | 10/2018 |

OTHER PUBLICATIONS

Extended European Search Report in EP21828375.2, dated Nov. 15, 2023, 9 pages.

* cited by examiner

LIVE BROADCAST INTERACTION METHOD AND APPARATUS, AND READABLE MEDIUM AND ELECTRONIC DEVICE

This application is a continuation of International Application No. PCT/CN2021/101708, filed on Jun. 23, 2021 which claims the priority to Chinese Patent Application No. 202010592409.2 titled "LIVE BROADCAST INTERACTION METHOD AND APPARATUS, AND READABLE MEDIUM AND ELECTRONIC DEVICE", filed on Jun. 24, 2020 with the China National Intellectual Property Administration, both of which are incorporated herein by reference in their entireties.

FIELD

The present disclosure relates to the field of Internet technology, to a live streaming interaction method and apparatus, and a readable medium and an electronic device.

BACKGROUND

With the popularity of mobile phones, tablets and other terminal devices and the continuous development of Internet technology, real-time video communication, such as live streaming on the Internet, has become increasingly popular.

During the live streaming, users watching the live streaming can trigger virtual objects, such as giving virtual gifts to an anchor or triggering "likes", to interact with the anchor, such that the interaction between users and the anchor is enhanced. Currently, when users trigger the virtual objects, the displayed effect is too simple and lacks interest, which cannot attract users to trigger virtual objects continuously, resulting in low activity in the live room and poor user experience.

SUMMARY

The section of the Summary is provided to introduce a concept in a simplified form that is described in detail in the section of Detailed Description of the Embodiments that follows. The section of the Summary is not intended to identify key features or essential features of the claimed technical solution, and is not intended to limit the scope of the claimed technical solution.

In a first aspect, a live streaming interaction method is provided in embodiments of the present disclosure. The live streaming interaction method includes: displaying an object trigger operation control in response to a selection operation of a user on a target virtual object in a live streaming viewing interface, where the object trigger operation control is used for the user to perform a target operation to continuously trigger the target virtual object; and controlling a first display control to move along a first preset path, in a process of the user performing the target operation on the object trigger operation control, where the first display control is used to display the number of target virtual objects currently triggered by the user in real time.

In a second aspect, a live streaming interaction apparatus is provided in embodiments of the present disclosure. The apparatus includes: a display module configured to display an object trigger operation control in response to a selection operation of a user on a target virtual object in a live streaming viewing interface, where the object trigger operation control is used for the user to perform a target operation to continuously trigger the target virtual object; and a first control module configured to control a first display control to move along a first preset path in a process of the user performing the target operation on the object trigger operation control, where the first display control is used to display the number of target virtual objects currently triggered by the user in real time.

In a third aspect, a computer-readable medium storing a computer program thereon is provided according to embodiments of the present disclosure. The program, when executed by a processing apparatus, performs steps of the live streaming interaction method according to the first aspect of the present disclosure.

In a fourth aspect, an electronic device is provided in embodiments of the present disclosure. The device includes: a storage apparatus storing a computer program; and a processing apparatus configured to execute the computer program stored in the storage apparatus to implement steps of the live streaming interaction method according to the first aspect of the present disclosure.

In the above technical solutions, in response to a selection operation of a user on a target virtual object in a live streaming viewing interface, an object trigger operation control may be displayed. The object trigger operation control is used for the user to perform a target operation to continuously trigger the target virtual object. Then, in a process of the user performing the target operation on the object trigger operation control, a first display control may be controlled to move along a first preset path. The first display control is used for displaying the number of target virtual objects currently triggered by the user in real time. In this way, the first display control with the number of target virtual objects displayed in real time can move along the first preset path, with the increase of the number of target virtual objects triggered by the user. In this way, the user can intuitively feel a dynamic effect of the process of increasing the number of target virtual objects, which is more interesting and can attract the user to continuously trigger the target virtual object. Thus, the activity of the live streaming room and the user experience are improved.

Other features and advantages of the present disclosure will be described in detail in the following embodiments.

BRIEF DESCRIPTION OF THE DRAWINGS

The above and other features, advantages and aspects of the embodiments of the present disclosure will become more apparent in combination with the accompanying drawings and with reference to the following embodiments. Throughout the drawings, the same or similar reference numerals represent the same or similar elements. It should be understood that the drawings are schematic and that the originals and elements are not necessarily drawn to scale. In the following drawings.

DETAILED DESCRIPTION OF EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments described herein. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include an additional step and/or an omitted step that is not shown herein. The scope of the present disclosure is not limited in this aspect.

The term "including" and variants thereof as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that the concepts such as "first" and "second" mentioned in the present disclosure are used to distinguish different apparatus, modules or units, and are not used to limit an sequential order or interdependence of the functions performed by the apparatus, modules or units.

It should be noted that, the modifications such as "one" and "multiple" mentioned in the present disclosure are schematic rather than restrictive, and should be understood as "one or more" by those skilled in the art, otherwise explicitly illustrated in the context.

The names of messages or information exchanged between multiple apparatuses in the embodiments of the present disclosure are only for illustrative purposes, and are not intended to limit the scope of the messages or information.

Figure 1:
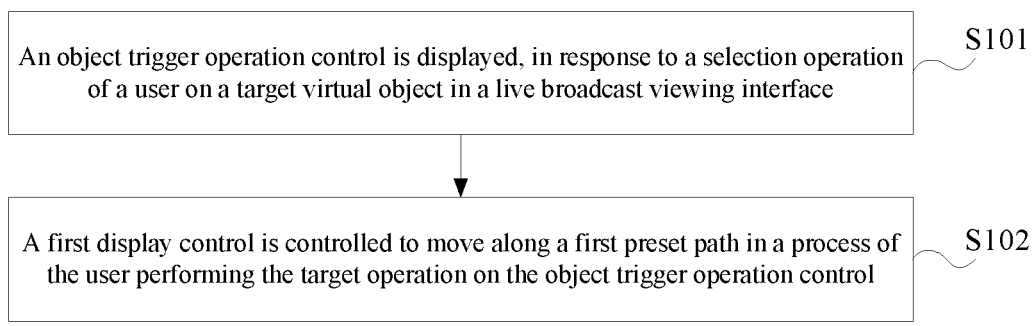
FIG. 1 is a flowchart of a live streaming interaction method according to an embodiment of the present disclosure.

FIG. 1 is a flowchart of a live streaming interaction method according to an embodiment of the present disclosure, which may be applied to terminals, such as smart phones, tablets, personal computers (PC), laptops and other terminal devices. As shown in FIG. 1, the method may include steps S101 and S102.

In step S101, an object trigger operation control is displayed, in response to a selection operation of a user on a target virtual object in a live streaming viewing interface.

The target virtual object may be any virtual object selected by the user in a process of viewing the live streaming. The virtual object may be a virtual gift, or a "like" trigger entry, such as a "like" button. Thus, the target virtual object may be any virtual gift that the user chooses to give to an anchor of a live streaming room in the process of viewing the live streaming. Alternatively, the target virtual object may be the "like" button triggered by the user in the process of viewing the live streaming. That is, the target virtual object may be the target virtual gift. The selection operation of the user on the target virtual object may indicate that the user clicks an icon of the target virtual object in an object list. For example, the object list may be a gift list, and the selection operation of the user on the target virtual object may indicate that the user clicks an icon of the target virtual gift in the gift list.

In response to the selection operation of the user on the target virtual object, a terminal may display the object trigger operation control. For example, the object trigger operation control the may be presented in a form of a button. The object trigger operation control may be used for the user to perform a target operation to continuously trigger the target virtual object. The target operation may include continuous interrupted clicking or continuous uninterrupted clicking. The continuous interrupted clicking means that the user continuously clicks the object trigger operation control at a short time interval. The continuous uninterrupted clicking means that the user presses the object trigger operation control for a long time. For example, the object trigger operation control may be a gift giving operation control, which may be used for the user to perform the target operation to continuously send target virtual gifts.

In step S102, a first display control is controlled to move along a first preset path in a process of the user performing the target operation on the object trigger operation control.

The terminal may monitor a screen click event to detect whether the user performs the target operation on the object trigger operation control, that is, to detect whether the user continuously clicks the object trigger operation control or performs a long press on the object trigger operation control. The terminal may control the first display control to move along the first preset path when it is detected that the user is performing the target operation on the object trigger operation control.

The first display control may be used to display the object number of the target virtual object currently triggered by the user in real time. For example, if the object number currently triggered by the user is 5, the number displayed by the first display control is 5. In an embodiment, the object number may be the number of gifts, and the first display control may be used to display the number of gifts of the target virtual gift currently sent by the user in real time. In another embodiment, the first display control may be used to display the number of "likes" currently triggered by the user, in real time.

The first preset path may be set in advance. The first preset path may be at any position on the live streaming viewing interface. For example, as the object number increases, the first display control may move from bottom to top from the bottom of the live video viewing interface. Alternatively, the first display control may also move from bottom to top from the object trigger operation control targeted by the user for target operation. In this way, the first display control, which displays the object number in real time, can move along the first preset path with the increase of the object number of the target virtual object triggered by the user. In this way, the user can intuitively feel a dynamic effect of the process of increasing the object number, have a stronger interest, and improve the activity of the live streaming room and improve the user experience.

It should be noted that the way in which the first display control moves along the first preset path in the above embodiments is only an exemplary description. The embodiments of the present disclosure do not make specific restrictions on the position of the first preset path in the live streaming viewing interface and the direction in which the first display control moves along the first preset path.

In the above technical solutions, in response to a selection operation of a user on a target virtual object in a live streaming viewing interface, an object trigger operation control may be displayed. The object trigger operation control is used for the user to perform a target operation to continuously trigger the target virtual object. Then, in a process of the user performing the target operation on the object trigger operation control, a first display control may be controlled to move along a first preset path. The first display control is used for displaying the object number of the target virtual object currently triggered by the user in real time. In this way, the first display control with the object number displayed in real time can move along the first preset path, with the increase of the object number of the target virtual object triggered by the user. In this way, the user can intuitively feel a dynamic effect of the process of increasing the object number, which is more interesting and can attract the user to continuously trigger the target virtual object. Thus, the activity of the live streaming room and the user experience are improved.

The live streaming interaction method according to the embodiments of the present disclosure is described in detail below in combination with the schematic diagram. It should be noted that in the following description of the embodiments of the present disclosure, the size, position, shape, quantity, etc. of the controls in the provided schematic diagram are only illustrative examples and do not constitute a limitation on the embodiments of the present disclosure.

Figure 2:
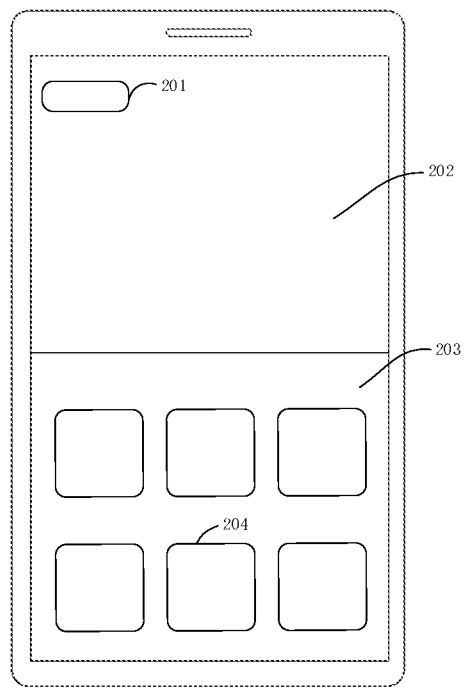
FIG. 2 is a schematic diagram of a live streaming viewing interface according to an embodiment of the present disclosure.

FIG. 2 is a schematic diagram of a live streaming viewing interface according to an embodiment of the present disclosure. When the user wants to give the virtual object to the anchor, a control for triggering an object may be clicked to jump to the interface shown in FIG. 2. The interface shown in FIG. 2 includes a control 201 for displaying information of the anchor, an area 202 for playing a live video, and an object list 203. The object list 203 includes multiple virtual objects. For example, the user selects a virtual object 204 as the target virtual object.

Figure 3:
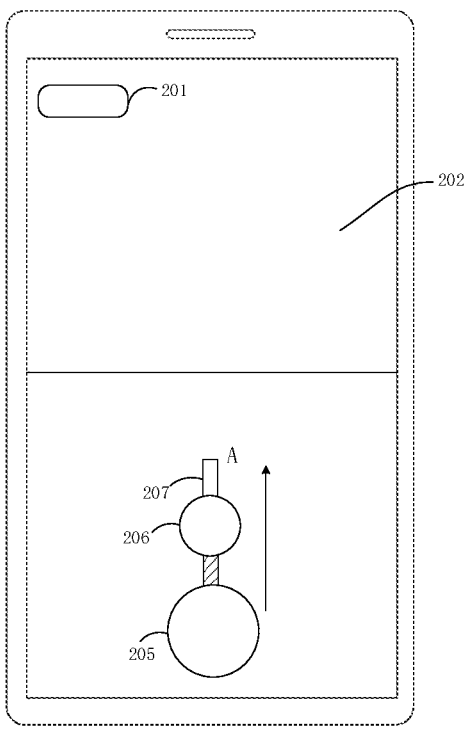
FIG. 3 is a schematic diagram of a first display control moving along a first preset path according to an embodiment of the present disclosure.

FIG. 3 is a schematic diagram of a first display control moving along a first preset path according to an embodiment of the present disclosure. As shown in FIG. 3, in response to the selection operation of the user on the target virtual object 204, the terminal may display the object trigger operation control 205. For example, the object trigger operation control 205 may be a round button and be displayed at an original location of the icon of the virtual object 204. The object trigger operation control 205 may present an animation effect of dynamic scaling in the selection operation of the user. In addition, in order to display a good dynamic effect of the movement of the first display control, the icons of other virtual objects in the object list may be displayed as a blur background.

In an embodiment of the present disclosure, when the first display control moves along the first preset path, a distance between the first display control and the object trigger operation control may increase with the increase of the object number.

As shown in FIG. 3, the first display control 206 is, for example, a circular control, which is used to display the number of target virtual objects currently triggered by the user in real time. The first preset path 207 may be used as a track for the first display control 206. The first display control 206 moves along the first preset path 207. In the embodiment shown in FIG. 3, a start position of the first preset path 207 may be a position of the object trigger operation control 205, and the direction in which the first display control 206 moves along the first preset path 207 may be from bottom to top as shown by the arrow. In this way, when the first display control 206 moves upward, the distance between the first display control 206 and the object trigger operation control 205 increases with the increase of the number of target virtual objects.

In an embodiment of the present disclosure, when the first display control moves along the first preset path, the first preset path may be marked such that the user can see the movement track of the first display control. In addition, in the movement process of the first display control along the first preset path, in the first preset path, the marked state of the position where the first display control has passed may be different from the marked state of the position where the first display control does not pass.

The embodiments of the present disclosure do not specifically limit the state information such as the color marked on the first preset path. For example, the marked state may include marked color information. The color of the position where the first display control has passed may have a stronger color or a less transparency, so as to clearly distinguish the position where the first display control has passed and the position where the first display control does not pass in the first preset path. In this way, the user can more intuitively see the movement process of the first display control.

As shown in FIG. 3, the first preset path 207 may be marked in the interface. In the first preset path 207, the position where the first display control 206 has passed is filled with gradient shadows to distinctively display the marked state of the position where the first display control 206 has passed from the marked state of the position where the first display control 206 does not passed.

In addition, the user performs the target operation on the object trigger operation control. That is, the user combos the object trigger operation control or perform a long press on the object trigger operation control. It is indicated that the user wants to trigger the target virtual object continuously. In an embodiment of the present disclosure, in order to improve an object trigger efficiency of the user, the increase rate of the number of target virtual objects may increase with the increase of the duration of the target operation, until the maximum increase rate is reached. That is, the number of target virtual objects triggered per second continues to increase until a preset maximum increase rate is reached. For example, the maximum increase rate may be set to trigger virtual objects 50 times per second. In this way, instead of triggering the virtual object once when the user clicks the object trigger operation control one time in the conventional technology, the increase rate of the number of target virtual objects continues to increase until the preset maximum increase rate is reached. In this way, the number of target virtual objects that the user wants to trigger can be reached in a shorter time, thus making the object trigger operation of the user more efficient and improving the object trigger efficiency.

In the embodiment of the present disclosure, in S102, the first display control may be controlled to move along the first preset path, by controlling the first display control to move along the first preset path at a speed corresponding to a preset first number threshold, and when the number of target virtual objects increases to the first number threshold, controlling the first display control to be located at an end position of the first preset path.

The first number threshold may be set in advance. In order to make the first display control just move to the end position of the first preset path when the number of target virtual objects increases to the first number threshold, it is necessary to control the movement rate of the first display control. The movement rate corresponding to the preset first number threshold is a rate required for the first display control to move from the start position to the end position of the first preset path at a uniform speed in a process of increasing the number of target virtual objects currently triggered to the first number threshold.

As shown in FIG. 3, the end position of the first preset path 207 is a point A. For example, the first number threshold is set to 10 or 66. When the number of target virtual objects increases from 0 to 10, the time required for the first display control 206 to move to the point A is short, and the movement rate may be relatively high. When the number of target virtual objects increases from 0 to 66, the time required for the first display control 206 to move to the point A is long, and the movement rate may be relatively slow.

In order to further improve the interest in the user object trigger process and the activity of the live streaming room, the live streaming interaction according to an embodiment of the present disclosure may also include: displaying a second display control in response to the number of target virtual objects increasing to the first number threshold, where the second display control is configured to display a special effect corresponding to the first number threshold.

The second display control, for example, may be some special effects, such as, a text bonus scene, a picture bonus scene; and may have a dynamic zoom animation effect. The second display control may be displayed anywhere in the live viewing interface. Different first number thresholds may correspond to different special effects. For example, when the first number threshold is 10, the displayed second display control may be a text special effect with the content of "Perfect". When the first number threshold is 66, the displayed second display control may be a text special effect with the content of "Awesome". When the first number threshold is 520, the displayed second display control may be a text special effect with the content of "Support for love". When the first number threshold is 1314, the displayed second display control may be a text special effect with the content of "All about you". It should be noted that the above values are only examples. The first number threshold is not limited to this, but can also be set to other values. The embodiments of the present disclosure do not specifically limit the first number threshold and the corresponding special effect content.

Figure 4:
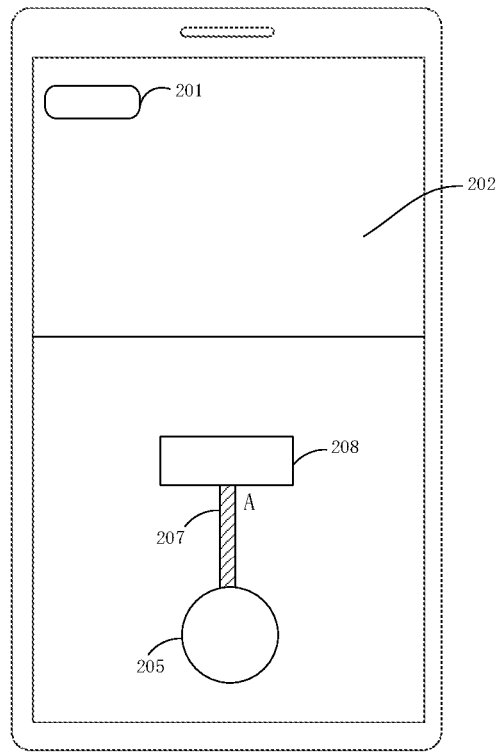
FIG. 4 is a schematic diagram of a second display control according to an embodiment of the present disclosure.

In an embodiment of the present disclosure, it is assumed that only one first number threshold is set, for example, any one of 10, 66, 520 and 1314. In an embodiment, when the number of target virtual objects increases to the first number threshold and exceeds the first number threshold, the second display control and the first display control may be displayed together until the user stops performing the combo or long press on the object trigger operation control. In another embodiment, when the number of target virtual objects increases to the first number threshold, the first display control may be controlled to exit the display, and then the second display control is displayed. Taking this embodiment as an example, as shown in FIG. 4, the first display control 206 may exit the display after moving to the point A, and the second display control 208 may display at the end position of the first preset path 207. Then, the second display control 208 may exit the display after has been displayed. If the number of target virtual objects exceeds the first number threshold, the first display control 206 may continue to be displayed at the point A until the user stops performing the combo or long press on the object trigger operation control 205.

in the case of multiple preset first number thresholds, the step of controlling the first display control to move along the first preset path may further include: if the first number threshold currently reached by the number of target virtual objects is not a maximum number threshold, controlling, the first display control to move along the first preset path again from the start position of the first preset path at a movement rate corresponding to a next first number threshold after the first display control is moved to the end position of the first preset path, where the next first number threshold is larger than a current first number threshold and is closest to the current first number threshold among the multiple first number thresholds.

As an example, the multiple preset first number thresholds may include, for example, 10, 66, 520 and 1314, in which 1314 is the maximum number threshold. For example, when the number of target virtual objects increases to 10, the first display control moves to the end position of the first preset path. Since 10 is not the maximum number threshold, the first display control is controlled to move along the first preset path at the movement rate corresponding to the next first number threshold 66 from the starting position of the first preset path. The movement rate corresponding to the first number threshold 66 is a rate required for controlling the first display control to move at a uniform speed from the start position to the end position of the first preset path when the number of target virtual objects increases from 11 to 66.

That is to say, if there are multiple first presets, each time the first display control is moved to the end position, the first display control moves again along the first preset path from the start position.

When there are multiple preset first number thresholds, each time the number of target virtual objects reaches the first number threshold, the second display control may be displayed to display the corresponding special effects. The step of controlling the first display control to move along the first preset path may further include:

displaying the second display control after the first display control is moved to the end position of the first preset path, where the second display control is configured to display a special effect corresponding to the first number threshold currently reached; and if the first number threshold currently reached by the number of target virtual objects is not the maximum number threshold, controlling the second display control to exit the display in response to a display duration of the second display control reaching a first preset duration; and then performing the step of controlling the first display control to move along the first preset path again from the start position of the first preset path at the movement rate corresponding to the next first number threshold. The first preset duration may be preset, for example, 1 s.

In an embodiment, after the first display control is moved to the end position, if the current first number threshold is not the maximum number threshold, the first display control may be controlled to exit the display, and then the second display control is displayed. That is, the first display control and the second display control are not displayed at the same time.

Figure 5:
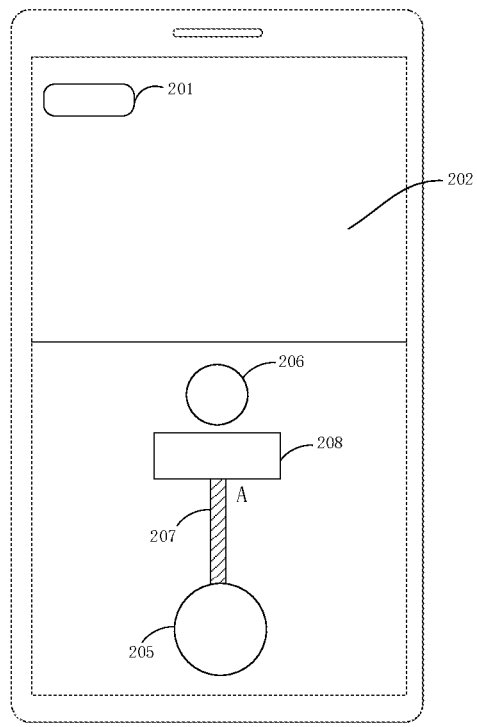
FIG. 5 is a schematic diagram of a case that a first display control and a second display control are simultaneously displayed according to an embodiment of the present disclosure.

In addition, after the first display control is moved to the end position, if the first number threshold currently reached is the maximum number threshold (such as 1314), the first display control and the second display control may be displayed at the same time until the user stops the target operation on the object trigger operation control. As shown in FIG. 5, when the first display control 206 and the second display control 208 are displayed at the same time, the content displayed by the second display control 208 may be a special effect corresponding to the maximum number threshold. A relative position of the first display control 206 and the second display control 208 will not be limited in the embodiments of the present disclosure, and FIG. 5 is only an example.

Taking the preset first number thresholds including 10, 66, 520 and 1314 as an example, a process of displaying the control is described in a complete embodiment. It should be noted that the embodiment is only for explanation and does not constitute a limitation on the embodiments of the disclosure.

As shown in FIG. 3, when the number of target virtual objects increases from 0 to 10, the first display control 206 moves upward. When the number of target virtual objects reaches 10, the first display control 206 moves to the point A. At this time, the first display control 206 may exit the display. Then, as shown in FIG. 4, the second display control 208 may be displayed at the end position of the first preset path 207. For example, the text effect with the content of "Perfect" is displayed. After the display duration of this text effect reaches the first preset duration, the display may be exited.

Then, the first display control 206 moves from the start position of the first preset path 207 to the top again at the movement rate corresponding to 66. When the number of target virtual objects reaches 66, the first display control 206 moves to the point A. At this time, the first display control 206 may exit the display, and then the second display control 208 is displayed at the end of the first preset path 207. For example, the text effect with the content of "Awesome" is displayed. After the display duration of this text effect reaches the first preset duration, the display may be exited.

After that, the first display control 206 moves from the start position of the first preset path 207 again, from bottom to top at the speed corresponding to 520. When the number of target virtual objects reaches 520, the first display control 206 moves to the point A. At this time, the first display control 206 may exit the display, and then the second display control 208 is displayed at the end of the first preset path 207. For example, the text effect with the content of "Support for love" is displayed. After the display duration of this text effect reaches the first preset duration, the display may be exited.

Then, the first display control 206 moves from the start position of the first preset path 207 again from bottom to top at the speed corresponding to 1314. When the number of target virtual objects reaches 1314, the first display control 206 moves to the point A. As shown in FIG. 5, the first display control 206 and the second display control 208 may be displayed at the same time until the user stops performing the combo or long press on the object trigger operation control 205. The second display control 208 is, for example, a text effect with the content of "All about you".

In this way, in the case of multiple first number thresholds, when the number of target virtual objects reaches each first number threshold, the corresponding special effects may be displayed, which can attract users to continuously trigger the target virtual objects, improve the enthusiasm of the user to trigger objects, make the live studio more active, and improve the user experience.

In addition, the live streaming interaction method according to an embodiment of the present disclosure may also include: displaying a special effect corresponding to the target virtual object in the case that the number of target virtual objects increases to the preset second number threshold.

The second number threshold may be set in advance, which may be the first number threshold or another threshold. The special effect corresponding to the target virtual object may be similar to the shape and color of the target virtual object. For example, if the target virtual object is a heart shape, the special effect of the target virtual object may also be a heart shape. For example, the special effect may be displayed around the object trigger operation control with animation effect to improve the display effect and enhance the interest in the user object trigger process.

There may be multiple preset second number thresholds. When the number of target virtual objects increases to different second number thresholds, the displayed special effects corresponding to the target virtual object may be different. For example, the more objects, the faster the special effects may be displayed, and the more special effects may be displayed.

A process of the user stopping the target operation on the object trigger operation control and the control exiting the display will be described in the following.

Figure 6:
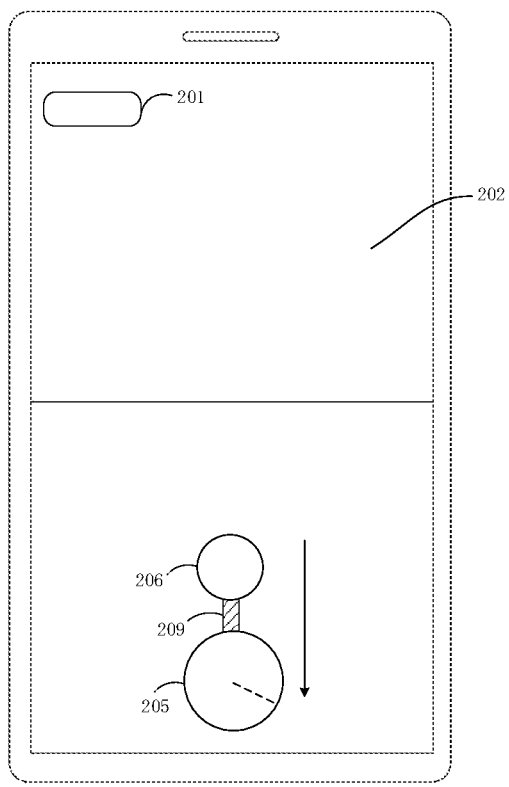
FIG. 6 is a schematic diagram of a first display control moving along a second preset path according to an embodiment of the present disclosure.

In an embodiment of the present disclosure, when the user stops the target operation on the object trigger operation control, the first display control may be controlled to move along a second preset path. A direction of the second preset path may be opposite to the direction of the first preset path. FIG. 6 is a schematic diagram of a first display control moving along a second preset path according to an embodiment of the present disclosure. As shown in FIG. 6, the first display control 206 may move along the second preset path 209 downward as shown by the arrow. For example, if the number of target virtual objects currently triggered is 22, the user may stop performing the combo or long press on the object trigger operation control 205, and the first display control 206 which is displayed with the number of 22 may be controlled to move downward.

In addition, a process of the second display control moving along the second preset path and a process of both the first display control and the second display control moving along the second preset path at the same time may be similar to the process shown in FIG. 6.

In the display process of the second display control, if the user stops the target operation on the object trigger operation control, the second display control may be controlled to move along the second preset path. As shown in FIG. 4, in the display process of the second display control 208, the text effect with the content of "Awesome" is displayed for example. In this case, if the user stops performing the combo or long press on the object trigger operation control 205, the text effect with the content of "Awesome" may be controlled to move downward.

In a simultaneous display process of the first display control and the second display control, if the user stops the target operation on the object trigger operation control, the first display control and the second display control may be controlled to move along the second preset path at the same time. As shown in FIG. 5, the first display control 206 and the second display control 208 are displayed at the same time. For example, the special effects with content of "1314" and "All about you" are displayed. If the user stops performing the combo or long press on the object trigger operation control 205, the special effects with content of "1314" and "All about you" may be controlled to move downward.

In an embodiment, in the process of the target display control moving along the second preset path, the distance between the target display control and the object trigger operation control becomes smaller and smaller. The target display control may include the first display control and/or the second display control.

The first display control is taken as an example. As shown in FIG. 6, in the process of the first display control 206 moving along the second preset path 209, the distance between the first display control 206 and the object triggered operation control 205 is decreased continuously. In this way, the dynamic effect of the first display control 206 falling down may be displayed when the user stops performing the combo or long press on the object trigger operation control, so as to enhance the interest and display effect.

In addition, in the process of the target display control moving along the second preset path, the marked part on the second preset path may be shortened with a movement of the target display control. The first display control is taken as an example. As shown in FIG. 6, the marked part on the second preset path 209 is filled with gradient shadows. This marked part is shortened as the first display control 206 moves downward. In this way, a dynamic effect that the second preset path 209 is shortened as the first display control 206 falls downward is shown.

When the target display control moves to the end position of the second preset path, the target display control is controlled to exit the display. The end position of the second preset path may be the start position of the first preset path. Taking the first display control as an example, the end position of the second preset path 209 may be the position of the object trigger operation control 205, as shown in FIG. 6. When the first display control 206 moves downward to this position, the first display control 206 may be controlled to exit the display.

The user stops the target operation on the object trigger operation control, which may indicate that the user does not want to continue to trigger the virtual object. In order to enable the first display control to exit the display quickly, the speed at which the first display control moves along the second preset path may be greater than the speed at which the first display control moves along the first preset path. As shown in FIG. 6, the first display control 206 drops down faster than the first display control 206 moves up.

In addition, when the user stops the target operation on the object trigger operation control, if the special effect corresponding to the target virtual object is displayed, the special effect may also be removed from the display.

It is considered that the user may want to trigger the target virtual object again after stopping performing the combo or long press on the object trigger operation control. In an embodiment of the present disclosure, if a time interval between a time when the user stops the target operation on the object triggering operation control and a time when the user performs the target operation again is less than a second preset duration, the first display control may be controlled to return to the position before moving along the second preset path, and the first display control may be controlled to continue moving along the first preset path.

When the user stops the target operation on the object trigger operation control, the object trigger operation control may display a countdown effect, as shown in FIG. 6. The countdown effect is shown by taking a rotation of a dotted line in the object trigger operation control 205 as an example. For example, the dotted line may be rotated clockwise or counterclockwise, and the duration of one circle may be the second preset duration (such as 2 s).

If the time interval between the time when the user stops the target operation on the object trigger operation control and the time when the user performs the target operation again is less than the second preset duration, it is indicated that the user wants to continue to give the target virtual object to the live streaming room anchor. At this time, the first display control may be controlled to return to the position before moving along the second preset path, and the number of target virtual objects triggered by the user displayed in the first display control is also the previous number. Later, in the process of the target operation by the user, the first display control may be controlled to continue moving along the first preset path.

Figure 7:
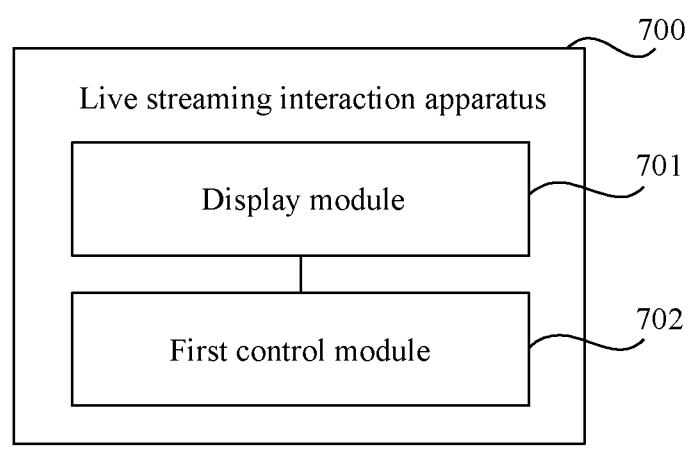
FIG. 7 is a schematic diagram of a live streaming interaction apparatus according to an embodiment of the present disclosure.

Based on the same inventive concept, a live streaming interaction apparatus is provided according to an embodiment of the present disclosure. FIG. 7 is a schematic diagram of a live streaming interaction apparatus according to an embodiment of the present disclosure. The device 700 may include a display module 701 and a first control module 702, as shown in FIG. 7.

The display module 701 is configured to display an object trigger operation control in response to a selection operation of a user on a target virtual object in a live streaming viewing interface, where the object trigger operation control is used for the user to perform a target operation to continuously trigger the target virtual object.

The first control module 702 is configured to control a first display control to move along a first preset path in a process of the user performing the target operation on the object trigger operation control, where the first display control is used to display the number of target virtual objects of the target virtual object currently triggered by the user in real time.

In the above technical solutions, in response to a selection operation of a user on a target virtual object in a live streaming viewing interface, an object trigger operation control may be displayed. The object trigger operation control is used for the user to perform a target operation to continuously trigger the target virtual object. Then, in a process of the user performing the target operation on the object trigger operation control, a first display control may be controlled to move along a first preset path. The first display control is used for displaying the number of target virtual objects currently triggered by the user in real time. In this way, the first display control with the number of target virtual objects displayed in real time can move along the first preset path, with the increase of the number of target virtual objects triggered by the user. In this way, the user can intuitively feel a dynamic effect of the process of increasing the number of target virtual objects, which is more interesting and can attract the user to continuously trigger the target virtual object. Thus, the activity of the live streaming room, and improve the user experience are improved.

According to one or more embodiments of the present disclosure, the first control module 702 may include: a first control submodule configured to control the first display control to move along the first preset path at a movement rate corresponding to a preset first number threshold, and locate the first display control at an end position of the first preset path in response to the number of target virtual objects increasing to the first number threshold.

According to one or more embodiments of the present disclosure, the device 700 may further include: a first display module configured to display a second display control in response to the number of target virtual objects increasing to the preset first number threshold, where the second display control is used to display a special effect corresponding to the first number threshold.

According to one or more embodiments of the present disclosure, there are multiple preset first number thresholds. The first control module 702 may further include: a second control submodule configured to control the first display control to move along the first preset path again from a start position of the first preset path at a movement rate corresponding to a next first number threshold, after the first display control is moved to the end position of the first preset path in the case that a first number threshold currently reached by the number of target virtual objects is not a maximum number threshold, where the next first number threshold is a first number threshold being larger than the currently reached first number threshold and being closest to the currently reached first number threshold among the plurality of the first number thresholds.

According to one or more embodiments of the present disclosure, the first control module 702 may also include: a display submodule configured to display a second display control after the first display control is moved to the end position of the first preset path, where the second display control is used to display a special effect corresponding to the currently reached first number threshold; and a third control submodule configured to control the second display control to exit a display in the case that the currently reached first number threshold is not the maximum number threshold and a display duration of the second display control reaches a first preset duration, where the second control submodule is triggered to control the first display control to move along the first preset path again from the start position of the first preset path at a movement rate corresponding to the next first number threshold.

According to one or more embodiments of the present disclosure, the first control module 702 may also include: a fourth control submodule configured to control the first display control to exit the display before displaying the second display control, after the first display control is moved to the end position of the first preset path in the case that the current reached first number threshold is not the maximum number threshold.

According to one or more embodiments of the present disclosure, the device 700 is further configured to: control the second display control to move along a second preset path in a display process of the second display control, in the case that the user stops the target operation on the object trigger operation control, where a direction of the second preset path is opposite to a direction of the first preset path.

According to one or more embodiments of the present disclosure, the device 700 may also include: a second control module configured to control the first display control to move along a second preset path in the case that the user stops the target operation on the object trigger operation control, where a direction of the second preset path is opposite to a direction of the first preset path.

According to one or more embodiments of the present disclosure, the device 700 may further include: a third control module configured to control the target display control to exit the display in the case that the target display control moves to an end position of the second preset path, where the target display control includes the first display control and/or the second display control.

According to one or more embodiments of the present disclosure, the device 700 may also include: a forth control module configured to control the first display control to return to a position before moving along the second preset path and control the first display control to continue moving along the first preset path, in the case that a time interval between a time when the user stops the target operation on the object trigger operation control and a time when the user performs the target operation on the object trigger operation control again is less than a second preset duration.

According to one or more embodiments of the present disclosure, the device 700 may also include: a second display module configured to display a special effect corresponding to the target virtual object in response to the number of target virtual objects increasing to a preset second number threshold.

As for the apparatus in the above embodiments, the specific mode of each module to perform operation has been described in detail in the embodiments of this method, which will not be described in detail herein.

Figure 8:
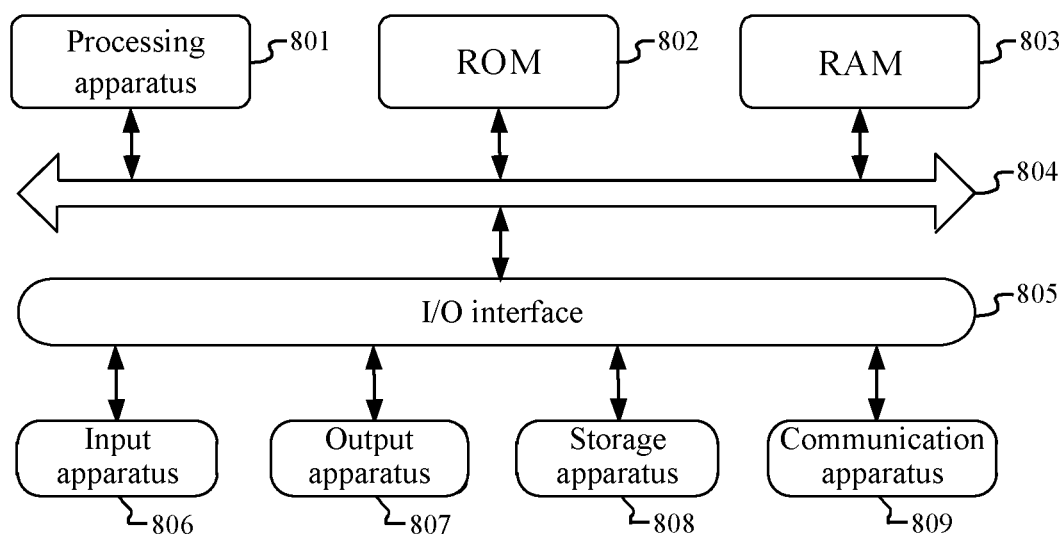
FIG. 8 is a structural diagram of an electronic device according to an embodiment of the present disclosure.

Referring to FIG. 8 below, a structural diagram of an electronic device 800 suitable for implementing an embodiment of the present disclosure is shown. The terminal devices in the embodiments of the present disclosure may include, but be not limited to, mobile terminals such as mobile phones, laptops, digital broadcast receivers, personal digital assistants (PDA), tablet computers (PAD), portable multimedia players (PMP), vehicle mounted terminals (such as vehicle mounted navigation terminals), and fixed terminals such as digital TVs, desktop computers, and the like. The electronic device shown in FIG. 8 is only an example, and there should be no restrictions on the function and scope of use of the embodiments of the present disclosure.

As shown in FIG. 8, the electronic device 800 may include a processing apparatus 801 (such as a central processor, a graphics processor, etc.), which may perform various appropriate actions and processes according to a program stored in the read-only memory (ROM) 802 or a program loaded from the storage apparatus 808 into the random access memory (RAM) 803. The RAM 803 also stores various programs and data required for the operation of the electronic device 800. The processing apparatus 801, ROM 802 and RAM 803 are connected to each other via bus 804. The input/output (I/O) interface 805 is also connected to the bus 804.

Generally, the following apparatuses may be connected to the I/O interface 805: an input apparatus 806, such as, a touch screen, a touch pad, a keyboard, a mouse, a camera, a microphone, an accelerometer, a gyroscope; an output apparatus 807, such as, a liquid crystal display (LCD), a loudspeaker, a vibrator; a storage apparatus 808, such as, a tape, a hard disk, and the like; and a communication apparatus 809. The communication apparatus 809 may allow the electronic device 800 to communicate wirelessly or wirelessly with other devices to exchange data. Although FIG. 8 shows an electronic device 800 having various apparatus, it should be understood that the illustrated apparatus are not necessarily required to all be implemented or embodied. Alternatively, more or fewer apparatuses may be implemented or included.

In particular, according to the embodiments of the present disclosure, the process described above with reference to the flowchart may be implemented as a computer software program. For example, embodiments of the present disclosure include a computer program product, which includes a computer program loaded on a non-transient computer-readable medium, and the computer program includes program code for executing the method shown in a flowchart. In such an embodiment, the computer program may be downloaded and installed from the network through the communication apparatus 809, or installed from the storage apparatus 808, or installed from the ROM 802. When the computer program is executed by the processing apparatus 801, the above functions defined in the method of the embodiment of the present disclosure are executed.

It should be noted that the computer-readable medium described in the embodiments of the present disclosure may be a computer-readable signal medium, a computer-readable storage medium, or any combination thereof. The computer-readable storage medium may be, for example, but not limited to, a system, an apparatus, or a device in an electronic, magnetic, optical, electromagnetic, infrared, or semiconductive form, or any combination thereof. More specific examples of the computer readable storage medium may be, but be not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, RF (radio frequency) and the like, or any proper combination thereof.

In some embodiments, the client device can communicate using any currently known or future developed network protocol such as HyperText Transfer Protocol (HTTP), and can be interconnected with any form or medium of digital data communication (e.g., a communication network). Examples of a communication network include a local area network ("LAN"), a wide area network ("WAN"), the Internet Work (for example, the Internet), and a peer-to-peer network (for example, an ad hoc peer-to-peer network), as well as any currently known network or a future developed network.

The computer readable medium may be incorporated in the electronic device, or may exist alone without being assembled into the electronic device.

The computer-readable medium carries one or more programs. The one or more programs, when executed by the electronic device, cause the electronic device to: display an object trigger operation control in response to a selection operation of a user on a target virtual object in a live streaming viewing interface, where the object trigger operation control is used for the user to perform a target operation to continuously trigger the target virtual object; and control a first display control to move along a first preset path in a process of the user performing the target operation on the object trigger operation control, where the first display control is used to display the number of target virtual objects currently triggered by the user in real time.

The computer program codes for performing the operations disclosed in the present disclosure may be written in one or more programming languages or combinations thereof. The programming languages include, but not limit to an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to the user computer through any network, including local area network (LAN) or wide area network (WAN), or may be connected to an external computer (for example, through the Internet provided by an Internet service provider).

Flowcharts and block diagrams in the drawings illustrate the architecture, functions and operations that can be implemented by a system, a method and a computer program produce according to various embodiments of the present disclosure. In this regard, each block in the flowchart or the block diagram may represent a module, a program segment, or a part of codes. The module, the program segment, or the part of codes includes one or more executable instructions used for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the block in the block diagram and/or flowchart and a combination of the blocks in the block diagram and/or flowchart may be implemented by a dedicated hardware-based system that performs specified functions or actions, or may be realized by a combination of dedicated hardware and computer instructions.

The modules mentioned in the embodiments of the present disclosure may be implemented by means of software, or otherwise by means of hardware. The name of the module does not constitute a restriction on the module itself in some cases. For example, the display module may also be described as "a display module for an object trigger operation control".

The functions described herein above may be performed, at least in part, by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the context of the present disclosure, the machine readable medium may be a tangible medium that may contain or store a program, and the program may be used by or in connection with an instruction execution system, apparatus or device. The machine readable medium may be a machine readable signal medium or a machine readable storage medium. The computer readable medium may include, but is not limited to, system, an apparatus, or a device in an electronic, magnetic, optical, electromagnetic, infrared, or semi-conductive form, or any suitable combination thereof. More specific examples of the machine readable storage medium may include, one or more wire based electrical connections, a portable computer disk, a hard disk, a random access memory (RAM), a read-only memory (ROM), an erasable programmable read-only memory (EPROM or Fast flash memory), an optical fiber, a portable compact disc read-only memory (CD-ROM), an optical storage device, a magnetic storage device or any suitable combination thereof.

According to one or more embodiments of the present disclosure, a live interaction method is provided according to a first example. The live interaction method includes: displaying an object trigger operation control in response to a selection operation of a user on a target virtual object in a live streaming viewing interface, where the object trigger operation control is used for the user to perform a target operation to continuously trigger the target virtual object; and controlling a first display control to move along a first preset path in a process of the user performing the target operation on the object trigger operation control, where the first display control is used to display the number of target virtual objects currently triggered by the user in real time.

According to one or more embodiments of the present disclosure, the method of the first example is provided according to a second example, where the target virtual object is a target virtual gift, the object trigger operation control is a gift giving operation control, and the number of target virtual objects is the number of target virtual gifts.

According to one or more embodiments of the present disclosure, the method of the first or second example is provided according to a third example. In the method, in a process of the first display control moving along the first preset path, a distance between the first display control and the object trigger operation control increases with an increase of the number of target virtual objects.

According to one or more embodiments of the present disclosure, the method of the first or second example is provided according to a fourth example. The controlling the first display control to move along the first preset path includes: controlling the first display control to move along the first preset path at a movement rate corresponding to a preset first number threshold; and locating the first display control at an end position of the first preset path in response to the number of target virtual objects increasing to the first number threshold.

According to one or more embodiments of the present disclosure, the method of the fourth example is provided according a fifth example. The method further includes: displaying a second display control in response to the number of target virtual objects increasing to the first number threshold, where the second display control is used to display a special effect corresponding to the first number threshold.

According to one or more embodiments of the present disclosure, the method of the fourth example is provided according a sixth example. In the method, the preset first number threshold includes multiple first number thresholds, and the controlling the first display control to move along the first preset path further includes: controlling the first display control to move along the first preset path again from a start position of the first preset path at a movement rate corresponding to a next first number threshold, after the first display control is moved to the end position of the first preset path in the case that a first number threshold currently reached by the number of target virtual objects is not a maximum number threshold, where the next first number threshold is a first number threshold being larger than the currently reached first number threshold and being closest to the current reached first number threshold among the plurality of the first number thresholds.

According to one or more embodiments of the present disclosure, the method of the sixth example is provided according to a seventh example. In the method, the controlling the first display control to move along the first preset path further includes: displaying a second display control in response to moving the first display control to the end position of the first preset path, where the second display control is used to display a special effect corresponding to the currently reached first number threshold; controlling the second display control to exit a display in the case that the currently reached first number threshold is not the maximum number threshold and a display duration of the second display control reaches a first preset duration; and after the second display control exits the display, performing the step of controlling the first display control to move along the first preset path again from the start position of the first preset path at the movement rate corresponding to the next first number threshold.

According to one or more embodiments of the present disclosure, the method of the seventh example is provided according to an eighth example. In the method, the controlling the first display control to move along the first preset path further includes: controlling the first display control to exit the display before displaying the second display control, in response to moving the first display control to the end position of the first preset path in the case that the current reached first number threshold is not the maximum number threshold.

According to one or more embodiments of the present disclosure, the method of the seventh example is provided according to a ninth example. The method further includes: displaying the first display control and the second display control at the same time until the user stops the target operation on the object trigger operation control, in response to moving the first display control to the end position of the first preset path in the case that the current reached first number threshold is the maximum number threshold.

According to one or more embodiments of the present disclosure, the method of the seventh example is provided according to a tenth example. The method further includes: controlling the second display control to move along a second preset path in a display process of the second display control, in the case that the user stops the target operation on the object trigger operation control, where a direction of the second preset path is opposite to a direction of the first preset path.

According to one or more embodiments of the present disclosure, the method of the first or second example is provided according to an eleventh example. The method further includes: controlling the first display control to move along a second preset path in the case that the user stops the target operation on the object trigger operation control, where a direction of the second preset path is opposite to a direction of the first preset path.

According to one or more embodiments of the present disclosure, the method of the eleventh example is provided according to an twelfth. In the method, in a process of moving the target display control along the second preset path, a distance between the target display control and the object trigger operation control continually decreases, where the target display control includes the first display control and/or the second display control.

According to one or more embodiments of the present disclosure, the method of the tenth or eleventh example is provided according to a thirteenth example. In the method, in a process of moving the target display control along the second preset path, a marked part on the second preset path is shortened with a movement of the target display control, where the target display control includes the first display control and/or the second display control.

According to one or more embodiments of the present disclosure, the method of the tenth or eleventh example is provided according to a fourteenth example. The method further includes: controlling the target display control to exit the display in response to moving the target display control to an end position of the second preset path, where the target display control including the first display control and/or the second display control.

According to one or more embodiments of the present disclosure, the method of the eleventh example is provided according to a fifteenth example. In the method, a speed of the first display control moving along the second preset path is faster than a speed of the first display control moving along the first preset path.

According to one or more embodiments of the present disclosure, the method of the eleventh example is provided according to a sixteenth example. The method further includes: in the case that a time interval between a time when the user stops the target operation on the object trigger operation control and a time when the user performs the target operation on the object trigger operation control again is less than a second preset duration, controlling the first display control to return to a position before moving along the second preset path and controlling the first display control to continue moving along the first preset path.

According to one or more embodiments of the present disclosure, the method of the first or second example is provided according to a seventeenth example. The method further includes: displaying a special effect corresponding to the target virtual object in response to the number of target virtual objects increasing to a preset second number threshold.

According to one or more embodiments of the present disclosure, the method of the seventeenth example is provided according to an eighteenth example. In the method, the preset second number threshold includes multiple second number thresholds; and when the number of the target virtual object increases to different second number thresholds, different special effects corresponding to the target virtual object are displayed.

According to one or more embodiments of the present disclosure, the method of the first or second example is provided according to a nineteenth example. In the method, the first preset path is marked, in a process of the first display control moving along the first preset path.

According to one or more embodiments of the present disclosure, the method of the nineteenth example is provided according to a twentieth example. In the method, in the process of the first display control moving along the first preset path, a marked state of the first preset path at a position where the first display control has passed is different from a marked state of the first preset path at a position where the first display control does not pass.

According to one or more embodiments of the present disclosure, the method of the first or second example is provided according to a twenty-first example. In the method, an increase rate of the number of target virtual objects is proportionate to a duration of the target operation, until a maximum increase rate is reached.

According to one or more embodiments of the present disclosure, a live interaction apparatus is provided according to a twenty-second example. The live interaction apparatus includes: a display module configured to display an object trigger operation control in response to a selection operation of a user on a target virtual object in a live streaming viewing interface, where the object trigger operation control is used for the user to perform a target operation to continuously trigger the target virtual object; and a first control module configured to control a first display control to move along a first preset path in a process of the user performing the target operation on the object trigger operation control, where the first display control is used to display the number of target virtual objects currently triggered by the user in real time.

According to one or more embodiments of the present disclosure, the apparatus of the twenty-second example is provided according to a twenty-third example. In the apparatus, the target virtual object is a target virtual gift, the object trigger operation control is a gift giving operation control, and the number of target virtual objects is the number of target virtual gifts.

According to one or more embodiments of the present disclosure, a computer-readable medium is provided according to a twenty-fourth example. A computer program is stored on the computer-readable medium. The program, when executed by a processing apparatus, causes the process apparatus to implement steps of the method of any one of the first to twenty-first examples.

According to one or more embodiments of the present disclosure, an electronic device is provided according to a twenty-fifth example. The electronic device includes: a storage apparatus storing a computer program; and a processing apparatus configured to execute the computer program stored on the storage apparatus to implement steps of the method of any one of the first to twenty-first examples.

The above description is only a preferred embodiment of the present disclosure and an explanation of the applied technical principles. Those skilled in the art should understand that the disclosure scope involved in the embodiments of the present disclosure is not limited to the technical solutions formed by the specific combination of the above technical features, but also covers other technical solutions formed by the arbitrary combination of the above technical features or their equivalent features without departing from the above disclosure concept. For example, the technical solution formed by replacing the above features with (but not limited to) the technical features with similar functions disclosed in the embodiments of the present disclosure.

Furthermore, although the operations are described in a particular order, this should not be understood as requiring the operations to be performed in the particular order shown or in a sequential order. Under certain circumstances, multitasking and parallel processing may be beneficial. Similarly, although the above discussion includes a number of specific implementation details, these should not be interpreted as limiting the scope of the embodiments of the present disclosure. Certain features described in the context of separate embodiments may also be implemented in a single embodiment in combination. Conversely, various features described in the context of a single embodiment may also be implemented in multiple embodiments individually or in any suitable sub combination.

Although the subject matter has been described in terms specific to the structural features and/or method logic actions, it should be understood that the subject matter defined in the appended claims is not necessarily limited to the specific features or actions described above. On the contrary, the specific features and actions described above are only examples of realizing the claims. As for the device in the above embodiment, the specific mode of each module to perform operation has been described in detail in the embodiment of this method, and will not be described in detail here.

The invention claimed is:

1. A live streaming interaction method, comprising:
displaying an object trigger operation control, in response to a selection operation of a user on a target virtual object in a live streaming viewing interface, wherein the object trigger operation control is used for the user to perform a target operation to continuously trigger the target virtual object, and the target virtual object is a target virtual gift; and
controlling a first display control to move along a first preset path, in a process of the user performing the target operation on the object trigger operation control, wherein the first display control is used to display a number of target virtual objects currently triggered by the user in real time,
wherein the controlling the first display control to move along the first preset path comprises:
controlling the first display control to move along the first preset path at a movement rate corresponding to a first number threshold; and
locating the first display control at an end position of the first preset path in response to the number of target virtual objects increasing to the first number threshold.

2. The live streaming interaction method according to claim 1, wherein the object trigger operation control is a gift giving operation control, and the number of target virtual objects is a number of target virtual gifts.

3. The live streaming interaction method according to claim 1, wherein in a process of the first display control moving along the first preset path, a distance between the first display control and the object trigger operation control increases with an increase of the number of target virtual objects.

4. The live streaming interaction method according to claim 1, further comprising:
displaying a second display control in a case that the number of target virtual objects increases to the first number threshold, wherein the second display control is configured to display a special effect corresponding to the first number threshold.

5. The live streaming interaction method according to claim 1, wherein the first number threshold comprises a plurality of first number thresholds, and the controlling the first display control to move along the first preset path further comprises:
controlling the first display control to move along the first preset path again from a start position of the first preset path at a movement rate corresponding to a next first number threshold after the first display control is moved to the end position of the first preset path, in a case that the first number threshold currently reached by the number of target virtual objects is not a maximum number threshold, wherein the next first number threshold is a first number threshold being larger than the current reached first number threshold and being closest to the current reached first number threshold among the plurality of the first number thresholds.

6. The live streaming interaction method according to claim 1, further comprising:
controlling the first display control to move along a second preset path in a case that the user stops the target operation on the object trigger operation control, wherein a direction of the second preset path is opposite to a direction of the first preset path.

7. The live streaming interaction method according to claim 1, further comprising:
displaying a special effect corresponding to the target virtual object in a case that the number of target virtual objects increases to a preset second number threshold.

8. The live streaming interaction method according to claim 1, wherein the first preset path is marked, in a process of the first display control moving along the first preset path.

9. The live streaming interaction method according to claim 1, wherein an increase rate of the number of target virtual objects is proportionate to a duration of the target operation, until a maximum increase rate is reached.

10. The live streaming interaction method according to claim 5, wherein the controlling the first display control to move along the first preset path further comprises:
displaying a second display control in response to moving the first display control to the end position of the first preset path, wherein the second display control is configured to display a special effect corresponding to the currently reached first number threshold; and
controlling the second display control to exit a display in a case that the currently reached first number threshold is not the maximum number threshold and a display duration of the second display control reaches a first preset duration; and after the second display control exits the display, performing the step of controlling the first display control to move along the first preset path again from the start position of the first preset path at the movement rate corresponding to the next first number threshold.

11. The live streaming interaction method according to claim 10, wherein the controlling the first display control to move along the first preset path further comprises:
controlling the first display control to exit the display before displaying the second display control, in response to moving the first display control to the end position of the first preset path in the case that the current reached first number threshold is not the maximum number threshold.

12. The live streaming interaction method according to claim 10, further comprising:
displaying the first display control and the second display control at the same time until the user stops the target operation on the object trigger operation control, in response to moving the first display control to the end position of the first preset path in a case that the current reached first number threshold is the maximum number threshold; or
controlling the second display control to move along a second preset path in a display process of the second display control, in a case that the user stops the target operation on the object trigger operation control, wherein a direction of the second preset path is opposite to a direction of the first preset path.

13. The live streaming interaction method according to claim 12, wherein in a process of moving the target display control along the second preset path, a distance between the target display control and the object trigger operation control continually decreases, wherein the target display control comprises the first display control and/or the second display control.

14. The live streaming interaction method according to claim 12, wherein in a process of moving the target display control along the second preset path, a marked part on the second preset path is shortened with a movement of the target display control, wherein the target display control comprises the first display control and/or the second display control.

15. The live streaming interaction method according to claim 12, further comprising:
controlling the target display control to exit the display in response to moving the target display control to an end position of the second preset path, wherein the target display control comprises the first display control and/or the second display control.

16. The live streaming interaction method according to claim 6, wherein a speed of the first display control moving along the second preset path is faster than a speed of the first display control moving along the first preset path.

17. The live streaming interaction method according to claim 6, further comprising:
in a case that a time interval between a time when the user stops the target operation on the object trigger operation control and a time when the user performs the target operation on the object trigger operation control again is less than a second preset duration, controlling the first display control to return to a position before moving along the second preset path and controlling the first display control to continue moving along the first preset path.

18. The live streaming interaction method according to claim 7, wherein the preset second number threshold comprises a plurality of second number thresholds; and when the number of target virtual objects increases to different second number thresholds, different special effects corresponding to the target virtual object are displayed.

19. The live streaming interaction method according to claim 8, wherein in the process of the first display control moving along the first preset path, a marked state of the first preset path at a position where the first display control has passed is different from a marked state of the first preset path at a position where the first display control does not pass.

20. A non-transitory computer-readable medium, wherein a computer program is stored on the computer-readable medium; and the program, when executed by a processing apparatus, cause the processing apparatus to
display an object trigger operation control, in response to a selection operation of a user on a target virtual object in a live streaming viewing interface, wherein the object trigger operation control is used for the user to perform a target operation to continuously trigger the target virtual object, and the target virtual object is a target virtual gift; and
control a first display control to move along a first preset path, in a process of the user performing the target operation on the object trigger operation control, wherein the first display control is used to display a number of target virtual objects currently triggered by the user in real time,
wherein the program, when executed by a processing apparatus, cause the processing apparatus to:
control the first display control to move along the first preset path at a movement rate corresponding to a first number threshold; and
locate the first display control at an end position of the first preset path in response to the number of target virtual objects increasing to the first number threshold.

21. An electronic device, comprising:
a storage apparatus storing a computer program; and
a processing apparatus configured to execute the computer program stored on the storage apparatus to
display an object trigger operation control, in response to a selection operation of a user on a target virtual object in a live streaming viewing interface, wherein the object trigger operation control is used for the user to perform a target operation to continuously trigger the target virtual object, and the target virtual object is a target virtual gift; and
control a first display control to move along a first preset path, in a process of the user performing the target operation on the object trigger operation control, wherein the first display control is used to display a number of target virtual objects currently triggered by the user in real time,
wherein a processing apparatus is configured to execute the computer program stored on the storage apparatus to:
control the first display control to move along the first preset path at a movement rate corresponding to a first number threshold; and
locate the first display control at an end position of the first preset path in response to the number of target virtual objects increasing to the first number threshold.

* * * * *